US012801936B2

(12) United States Patent
Rizk et al.

(10) Patent No.: US 12,801,936 B2
(45) Date of Patent: Nov. 17, 2026

(54) DYNAMIC SELECTION OF AI COMPUTER MODELS TO REDUCE COSTS AND MAXIMIZE USER EXPERIENCE

(71) Applicant: International Business Machines Corporation, Armonk, NY (US)

(72) Inventors: Yara Rizk, Cambridge, MA (US); Vatche Isahagian, Belmont, MA (US); Vinod Muthusamy, Austin, TX (US); David John Piorkowski, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 18/370,973

(22) Filed: Sep. 21, 2023

(65) Prior Publication Data

US 2025/0103908 A1 Mar. 27, 2025

(51) Int. Cl.
*G06N 3/10* (2006.01)

(52) U.S. Cl.
CPC .................................... *G06N 3/10* (2013.01)

(58) Field of Classification Search
CPC .................................................... G06N 3/10
See application file for complete search history.

(56) References Cited

U.S. PATENT DOCUMENTS 8,843,470 B2 9/2014 Li et al.
10,831,997 B2 11/2020 Lin
10,832,003 B2 11/2020 Costello
11,128,737 B1 9/2021 Fox et al.
11,501,547 B1 * 11/2022 Jade ................ G06V 30/19113
11,544,634 B2 1/2023 Kamulete
11,636,309 B2 4/2023 Fisher et al.
12,511,282 B1 * 12/2025 Ojha ................ G06F 16/24522
2020/0097563 A1 3/2020 Alexander et al.
2021/0304003 A1 * 9/2021 Johnson ................ G06F 18/217
2022/0036177 A1 * 2/2022 Sriharsha ................ G06N 3/10
2023/0177441 A1 * 6/2023 Durvasula ........ G06Q 10/06375
706/45

(Continued)

OTHER PUBLICATIONS

Anonymous, "An optimized IT subsystem health scoring method through combination of Time series model and traditional Machine Learning model", IP.com Prior Art Database Technical Disclosure, IP.com No. IPCOM000260282D, Nov. 9, 2019, 6 pages.

(Continued)

*Primary Examiner* — Stephen T Gundry
(74) *Attorney, Agent, or Firm* — Harrity & Harrity, LLP

(57) ABSTRACT

Mechanisms are provided for selecting an artificial intelligence (AI) computer model for processing an input. The mechanisms generate a distribution of characteristics of previous input data processed by the data processing system. The mechanisms receive current input data and compare characteristics of the current input data to the distribution to generate a measure of similarity. An AI computer model selection engine processes the measure of similarity to select an AI computer model from a plurality of different AI computer models. The processing of the measure of similarity includes evaluation of the measure of similarity relative to one or more threshold values. The current input data is processed by the selected AI computer model to generate a result of processing the current input data.

20 Claims, 6 Drawing Sheets

| METRIC/APPROACH 140 | RULE-BASED (E.G., REGEX) 110<br>regular–expression:<br>- '(?<operation>plot\|chart)'<br>- '(?P<type>bar graph \| line graph)' | SHALLOW CLASSIFIERS (SHALLOW ML) 120 | FOUNDATION MODELS (E.G., LLM) 130 |
|---|---|---|---|
| INPUT DIVERSITY | LOW (WORST) | MEDIUM | HIGH (BEST) |
| DATA AMOUNT | LOW (BEST) | MEDIUM | HIGH (WORST) |
| ACCURACY (OUT OF DISTRIBUTION) | LOW (WORST) | MEDIUM | HIGH (BEST) |
| CODING COMPLEXITY | HIGH (WORST) | MEDIUM | LOW (BEST) |
| AI EXPERTISE | LOW (BEST) | MEDIUM | HIGH (WORST) |
| NON-DETERMINISM | LOW (BEST) | MEDIUM | HIGH (WORST) |
| HARDWARE COSTS (ALSO AFFECTS RESPONSE TIME) | LOW (BEST) | MEDIUM | HIGH (WORST) |
| CARBON FOOTPRINT | LOW (BEST) | MEDIUM | HIGH (WORST) |

(56) References Cited

U.S. PATENT DOCUMENTS

| | | | | |
|---|---|---|---|---|
| 2023/0237348 | A1 * | 7/2023 | Polleri | G06F 16/2423 706/12 |
| 2024/0386667 | A1 * | 11/2024 | Ensing | H04N 21/21805 |
| 2025/0131048 | A1 * | 4/2025 | Sarah | G06F 16/953 |
| 2025/0138507 | A1 * | 5/2025 | Coffman | G05B 19/4097 |
| 2025/0156898 | A1 * | 5/2025 | Crabtree | G06Q 30/0277 |
| 2025/0181728 | A1 * | 6/2025 | Myers | G06F 21/552 |
| 2025/0184212 | A1 * | 6/2025 | Howard | A61P 25/28 |
| 2025/0190459 | A1 * | 6/2025 | Conway | G06N 3/0475 |
| 2025/0190460 | A1 * | 6/2025 | Madisetti | G06F 16/3329 |
| 2025/0200033 | A1 * | 6/2025 | Naufel | G06F 16/243 |
| 2025/0232227 | A1 * | 7/2025 | Chen | G06F 11/3438 |
| 2025/0244964 | A1 * | 7/2025 | Mystetskyi | G06F 8/65 |
| 2026/0010738 | A1 * | 1/2026 | Gardner | G06F 40/56 |
| 2026/0017023 | A1 * | 1/2026 | Chen | G06F 8/30 |
| 2026/0032155 | A1 * | 1/2026 | Mystetskyi | G06Q 10/06316 |
| 2026/0037566 | A1 * | 2/2026 | Linder | G06F 16/345 |
| 2026/0037810 | A1 * | 2/2026 | Edwards | G06F 18/24133 |
| 2026/0044541 | A1 * | 2/2026 | Madisetti | G06F 16/3329 |

OTHER PUBLICATIONS

Anonymous, "Machine Learning(LSTM) based solution for the Regression Triage & it's Applications", IP.com Prior Art Database Technical Disclosure, IP.com No. IPCOM000264163D, Nov. 17, 2020, 8 pages.

Anonymous, "Machine-Learning for Optimization of Software Parameters", IP.com Prior Art Database Technical Disclosure, IP.com No. IPCOM000252023D, Dec. 13, 2017, 35 pages.

Chen, Lingjiao et al., "FrugalGPT: How to Use Large Language Models While Reducing Cost and Improving Performance", arXiv:2305.05176v1 [cs.LG], May 9, 2023, 13 pages.

Heikkilä, Melissa, "We're getting a better idea of AI's true carbon footprint", MIT Technology Review, Nov. 14, 2022, 8 pages.

Henderson, Peter et al., "Towards the Systematic Reporting of the Energy and Carbon Footprints of Machine Learning", Journal of Machine Learning Research 21 (2020) 1-43, Nov. 2020, 43 pages.

Keeney, R. L. et al., "Decisions with Multiple Objectives: Preferences and Value Trade-Offs", IEEE Transactions on Systems, Man, and Cybernetics, vol. 9, Issue: 7, Jul. 1979, 2 pages.

Lakara, Kumud et al., "Evaluating Predictive Uncertainty and Robustness to Distributional Shift Using Real World Data", Bayesian Deep Learning Workshop, NeurIPS 2021, Dec. 14, 2021, 7 pages.

Luccioni, Alexandra S. et al., "Estimating the Carbon Footprint of BLOOM, a 176B Parameter Language Model", arXiv:2211.02001v1 [cs.LG], Nov. 3, 2022, 10 pages.

Patterson, David et al., "Carbon Emissions and Large Neural Network Training", arXiv:2104.10350v3 [cs.LG], Apr. 23, 2021, 22 pages.

Rusak, Evgenia et al., "If your data distribution shifts, use self-learning", arXiv:2104.12928v3, Nov. 29, 2022, 48 pages.

Schrouff, Jessica et al., "Diagnosing failures of fairness transfer across distribution shift in real-world medical settings", arXiv:2202.01034v2 [cs.LG], Feb. 10, 2023, 31 pages.

Soomro, Altaf M. et al., "A review on motivational nudges for enhancing building energy conservation behavior", Journal of Smart Environments and Green Computing 2021;1:3-20, Mar. 30, 2021, 18 pages.

Tiefenbeck, Verena et al., "Overcoming Salience Bias: How Real-Time Feedback Fosters Resource Conservation", Management Science vol. 64, No. 3, Mar. 2018, 20 pages.

Wiles, Olivia et al., "A Fine-Grained Analysis on Distribution Shift", arXiv:2110.11328v2 [cs.LG], Nov. 25, 2021, 36 pages.

* cited by examiner

<table>
<tr><td></td><td>“Plot data bar graph”</td><td>“Generate a pie chart”</td><td>“Analyze the data distribution by visualizing it”</td></tr>
<tr><td>METRIC/APPROACH<br>140</td><td>RULE-BASED (E.G., REGEX)<br>110<br>regular–expression:<br>- ‘(?<operation>plot|chart)’<br>- ‘(?P<type>bar graph | line graph)’</td><td>SHALLOW CLASSIFIERS (SHALLOW ML) 120<br>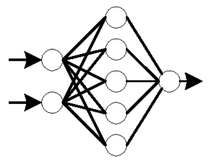</td><td>FOUNDATION MODELS (E.G., LLM) 130<br>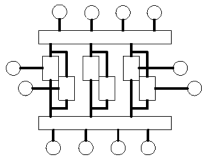</td></tr>
<tr><td>INPUT DIVERSITY</td><td>LOW (WORST)</td><td>MEDIUM</td><td>HIGH (BEST)</td></tr>
<tr><td>DATA AMOUNT</td><td>LOW (BEST)</td><td>MEDIUM</td><td>HIGH (WORST)</td></tr>
<tr><td>ACCURACY (OUT OF DISTRIBUTION)</td><td>LOW (WORST)</td><td>MEDIUM</td><td>HIGH (BEST)</td></tr>
<tr><td>CODING COMPLEXITY</td><td>HIGH (WORST)</td><td>MEDIUM</td><td>LOW (BEST)</td></tr>
<tr><td>AI EXPERTISE</td><td>LOW (BEST)</td><td>MEDIUM</td><td>HIGH (WORST)</td></tr>
<tr><td>NON-DETERMINISM</td><td>LOW (BEST)</td><td>MEDIUM</td><td>HIGH (WORST)</td></tr>
<tr><td>HARDWARE COSTS (ALSO AFFECTS RESPONSE TIME)</td><td>LOW (BEST)</td><td>MEDIUM</td><td>HIGH (WORST)</td></tr>
<tr><td>CARBON FOOTPRINT</td><td>LOW (BEST)</td><td>MEDIUM</td><td>HIGH (WORST)</td></tr>
</table>

*FIG. 1*

DYNAMIC SELECTION OF AI COMPUTER MODELS TO REDUCE COSTS AND MAXIMIZE USER EXPERIENCE

BACKGROUND

The present application relates generally to an improved data processing apparatus and method and more specifically to an improved computing tool and improved computing tool operations/functionality for dynamic selection of artificial intelligence computer models to reduce costs and maximize user experience.

Artificial Intelligence (AI) computer models have been developed for various applications. As these AI computer models have been developed over time, there is now a large range of AI computer models that organizations and users can use to process input data and generate results. This range of AI computer models ranges from relative non-complex AI models such as rules based engines, to moderately complex AI models such as shallow classifiers, convolutional neural networks (CNNs), and the like, to high complexity AI models, such as deep learning neural networks (DNNs), large language models (LLMs), and the like, which are trained on massive amounts of data to perform highly complex operations handling large diversities in input data.

There is a tendency, as improvements in AI computer models are made over time, for users and organizations to utilize the most versatile and accurate AI computer model for processing their input data regardless of the complexity of the input data. However, such tendencies may not be cost effective as often the more versatile computer models tend to have increased costs.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for selecting an artificial intelligence (AI) computer model for processing an input. The method comprises generating a distribution of characteristics of previous input data processed by the data processing system. The method further comprises receiving current input data and comparing characteristics of the current input data to the distribution to generate a measure of similarity. The method also comprises processing, by an AI computer model selection engine, the measure of similarity to select an AI computer model from a plurality of different AI computer models. The processing of the measure of similarity comprises evaluation of the measure of similarity relative to one or more threshold values. In addition, the method comprises processing the current input data by the selected AI computer model to generate a result of processing the current input data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram of a comparison of artificial intelligence computer models with regard to metrics/costs;

DETAILED DESCRIPTION

Figure 2:
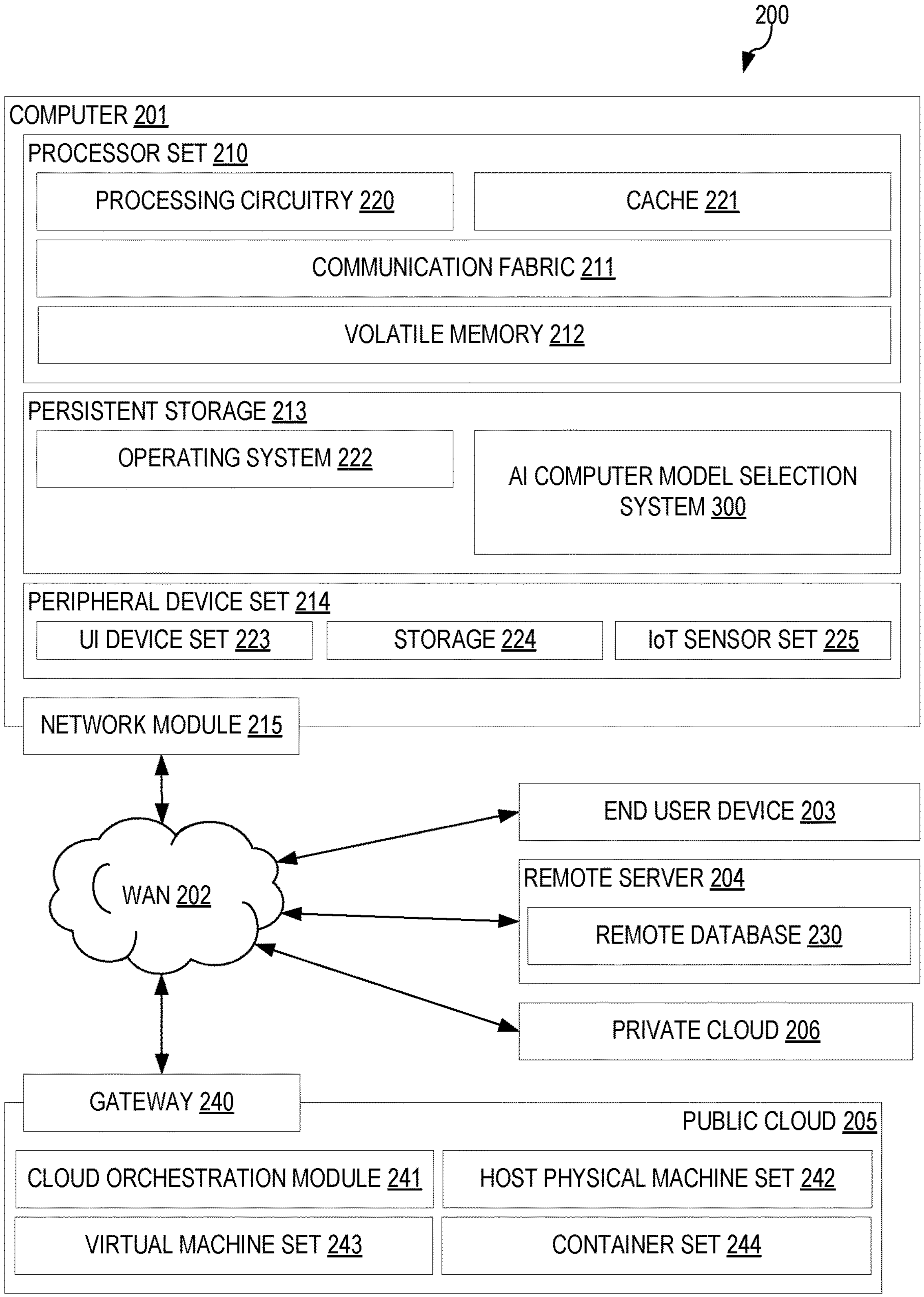
FIG. 2 is an example diagram of a distributed data processing system environment in which aspects of the illustrative embodiments may be implemented and at least some of the computer code involved in performing the inventive methods may be executed.

As mentioned above, there is a large range of Artificial Intelligence (AI) computer models that organizations and users can use to process input data and generate results, e.g., rules based engines, shallow classifiers, and foundation models, e.g., deep learning neural networks, large language models, etc. Each of these AI computer model options have different levels of costs associated with them and corresponding different levels of quality metrics, e.g., accuracy, for different types of inputs. For example, rules-based engines are relatively low cost when it comes to criteria such as carbon footprint, hardware costs, AI expertise required to implement, amount of data needed to train the AI computer model, and the like. However, rules-based engines also do not handle large diversity in the input data, have relatively low accuracy with regard to inputs that do not fit the specific inputs expected by the rules, and have relatively higher coding complexity as they require a large set of rules to handle the various inputs and these rules tend to not be very flexible with regard to the input. On the other hand, foundation models can handle large diversity in the inputs that they are able to process accurately, have high accuracy and low coding complexity, but require large amounts of data to train the foundation models, require a high level of AI expertise on the part of those providing the foundation model, and large costs with regard to hardware and carbon footprint. Shallow classifiers fall in the middle between the relatively low complexity rules-based engines and the relatively high complexity foundation models.

While the highly complex foundation models, e.g., large scale deep learning neural networks (DNNs) trained on massive amounts of data, large language models (LLMs) such as ChatGPT available from OpenAI, and the like, are able to handle a large range of different types of inputs, i.e., they have high input diversity capabilities, this does not mean that they are the most cost effective solution for processing all input data. That is, for some inputs, a rules based engine may provide a similar level of accuracy in the results generated to that of a foundation model, but with considerably lower costs. Similarly, for some inputs, a shallow classifier may provide a similar level of accuracy, or even in some cases greater quality when specialized shallow classifiers are utilized, in results to that of a foundation model, but more accurate results than that of a rules-based engine. Thus, if one were to always utilize the foundation models for processing all inputs, one would incur additional costs without obtaining a commensurate additional benefit, e.g., one could get a similar accuracy of results with lower cost solutions. For example, if it is estimated that it takes $0.02 in hardware costs, carbon footprint costs, etc. to provide a result to an input by using a rules-based engine, $0.50 to provide a result to the input by using a shallow classifier, and $2.00 to provide a result to an input by using a foundation model, and each provides a similar level of accuracy, if one were to use the foundation model, there would be additional costs for no appreciable benefit.

Thus, in order to minimize costs, it would be beneficial to have a mechanism that is able to dynamically select which AI computer model solution to use for processing an input based on characteristics of the input and the costs/benefits associated with each of the AI computer model solutions. That is, it would be beneficial to have an improved computing tool and improved computing tool operations/functionality that can automatically select which AI computer model to utilize in processing an input from an input data provider based on characteristics of the input data, such as a distribution of the input data over time and correlation of a current input to the distribution of the input data, where the selection minimizes costs while maximizing user experience, such as maximizing performance metrics, e.g., accuracy, with regard to the results generated by the selected AI computer model.

For example, consider an application in which a conversation bot is provided where the user can input a natural language sentence and receive an automatically generated response from the conversation bot. There may be many different ways that a user can formulate a similar request when inputting the request to the conversation bot. For example, if a user wishes to visualize the data of a spreadsheet, the user may input a sentence of the type "Plot data bar graph" or "Generate a pie chart" or "I want to analyze the distribution of the data by visualizing it". Each of these sentences have a different level of complexity, but all of them are directed to visualizing the data in a spreadsheet. In order for an AI computer model to be able to process this natural language input, however, the AI computer model must be able to determine the intent of the sentence in order to know how to respond and provide accurate results of processing the input sentence. Some AI models may be able to handle the less complex sentences and determine the intent of the sentence accurately, but may not be able to accurately identify the intent and process the more complex sentences.

For example a rules-based engine may be able to determine that the sentence "Plot data bar graph" may utilize fixed predefined rules that specifically look for the term "Plot" and determine that if the term "Plot" is used as a verb in a sentence, that the intent of the sentence is to generate a graph. This, in combination with the term "bar graph" may allow the rules-based engine to determine that the user wishes to the system to plot a bar graph of the data. However, a rules-based engine may not be able to determine what the intent of the user is in the sentence "I want to analyze the distribution of the data by visualizing it" since the rules-based engine is looking for specific terms/phrases that match the criteria specified in the fixed set of rules employed by the rules-based engine. To the contrary, a more complex large language model (LLM) or deep learning neural network (DNN), trained on large data sets and able to handle a vast diversity of inputs, i.e., a foundation model, may be needed.

Similarly, the sentence "generate a pie chart" may not be able to be handled by the rules-based engine as it may not have rules to determine what is intended by the term "generate" in this context, but an AI model, such as a shallow classifier or other convolutional neural network may be trained to handle such input sentences and determine the intent. In such cases, it may not be necessary to employ the large scale foundation models, but instead an intermediately complex AI computer model, e.g., a convolutional neural network, may be able to accurately determine the intent of the sentence and provide accurate results, i.e., determine the intent and generate the requested pie chart to visualize the data of the spreadsheet.

Thus, various AI computer models have different capabilities for handling different types of input data at varying expense. FIG. 1 is an example diagram illustrating examples of some types of AI computer models and their corresponding performance metrics/costs. As shown in FIG. 1, three different types of AI computer models are represented, i.e., a rules-based computer model 110, a shallow classifier computer model 120, and foundation computer models 130. Corresponding metrics/costs 140 are shown in each column representing relative low, medium, or high levels of the corresponding metric/cost specified for each row. The metrics/costs 140 shown in FIG. 1 include input diversity (how different are the inputs that the AI computer model can accurately process), data amount (how much data is needed to train the AI computer model), accuracy with out of input distribution inputs, coding complexity (how hard is it to generate and maintain the AI computer model), AI expertise (how much knowledge do human administrators need to generate, maintain, and/or operate the AI computer model), non-determinism (how likely is it that the AI computer model will generate different outputs for similar inputs), hardware costs (which may also affect response times), and carbon footprint. These are only examples of the various metrics/costs 140 that may be evaluated with regard to the various AI computer models 110-130.

These metrics/costs 140 in the rows represent criteria that are evaluated when determining the relative overall "cost" of using the corresponding model 110-130 to process input data. Moreover, these metrics/costs 140 may be the basis for specifying constraints on AI computer model selections as discussed hereafter, e.g., "minimize carbon footprint costs" or "carbon footprint cost less than X".

Just as FIG. 1 references three different types of AI computer models, the following example illustrative embodiments will assume that these three types of AI computer models are the types of AI computer models from which to select an AI computer model to process an input. However, it should be appreciated that these are only examples. Depending on the desired implementation, more or less AI computer models may be evaluated which may be of similar of different types from those shown in FIG. 1. Moreover, each type of AI computer model may be broken down into a plurality of lower level categories of AI computer model, e.g., different types or specific ones of rules-based AI computer models, with similar evaluates of metrics/costs 140 being utilized and with similar mechanisms of the illustrative embodiments being used to select between the various available AI computer models. Thus, many modifications to the illustrative embodiments, as will be described hereafter, will be apparent to those of ordinary skill in the art in view of the present description and such modifications are intended to be within the spirit and scope of the present invention.

The illustrative embodiments provide an improved computing tool and improved computing tool operations/functionality for dynamically selecting artificial intelligence (AI) computer models to reduce costs and maximize user experience. The dynamic selection of the AI computer models is based on a distribution of the inputs from the input provider, e.g., a user or group of users, and similarities between the inputs being submitted by the input provider. In addition, the dynamic selection may be based on specified constraints for selection of the AI computer models. Based on these criteria, a selection model determines, between a predefined set of trained AI computer models, which AI computer model to send the input data to in order to generate a result. The selection operates to minimize costs of the particular AI computer model selected, while maximizing user experience, e.g., maximizing accuracy, within the specified constraints.

For example, the pre-trained AI computer models may include a rule-based AI computer model, a shallow classifier machine learning computer model, and a large-scale deep learning AI computer model, also referred to herein as a foundation model. These computer models vary in complexity, costs in terms of resources for training the computer models, and costs in terms of resources for utilizing the computer models to process user inputs. The costs not only include computing resource costs, e.g., memory, processor, network bandwidth, data costs for training, but also personnel costs for managing and maintaining the various AI computer model solutions, utility costs, e.g., electricity for the hardware equipment itself as well as ancillary equipment such as cooling and airflow equipment, and environmental costs such as carbon footprint costs. These costs tend to be relatively larger with increased relative complexity, however the more complex the AI computer model the more diversity that may be accommodated in the inputs that the AI computer model can accurately process. This leads to a tradeoff between costs and diversity of inputs able to be processed.

In order to collect data about resource consumption and other cost metrics related to asset management for the various AI computer models, such data may be collected and processed automatically by such data collection and processing tools, e.g., IBM Maximo, available from International Business Machines (IBM) Corporation of Armonk, New York. In addition, or alternatively, such resource consumption information may be provided by authorized users or other sources of such information as input. The collected data is processed to calculate the values of various constraints, such as hardware costs, carbon footprint, energy consumption, thermal emissions, and the like.

In addition to these constraints, users and system administrators may further specify constraints on the selection of AI computer models for processing inputs. The user and system administrator constraints may specify criteria for optimizing the selection of the AI computer models, e.g., "optimize for carbon footprint", "optimize for response time", etc. Such constraints may be specified via one or more user interfaces, system administrator interfaces, and the like, that allow input of such user/admin constraints. Moreover, such constraints may come from various sources of information, such as policies specified by the organization using or implementing the computing system that employs the AI computer models to perform operations, where these policies may specify a satisfactory level of risk that the organization is willing to undertake with regard to using various types of AI computer models. These constraints may come from user or administrator specified preferences, such as may be specified in a user/administrator profile, e.g., minimize carbon footprint, etc. These constraints may also be system constraints, which may be defined either by product administrator, e.g., response time is 2 seconds, or may be defined geographically, e.g., the AI computer model needs to run in Europe.

Once the constraints are gathered, it is important to distinguish soft constraints from hard constraints. Soft constraints can be violated while hard constraints cannot be. Considering all constraints as hard constraints will often result in a null solution space, i.e., no solution, e.g., selection of an AI computer model, will be found that satisfies all of the constraints. For example, hard constraints on both latency and cost may not be achievable, since satisfying a low latency requirement may require using an expensive GPU that violates the cost requirements, and likewise satisfying the cost requirement might require using a cheaper CPU which may lead to violating the latency requirements. Which constraints may be considered soft constraints and which are hard constraints may be specified by the user/administrator when specifying the constraints themselves, e.g., via the user/admin interfaces.

However, for some constraints, the users/administrator may not know which constraints to designate soft/hard. In these cases, the system can present the conflicting constraints to the user/administrator and ask them to rank the constraints or designate some of them as soft constraints. For example, the system may indicate that it is not possible to find a solution that satisfies both the latency and cost constraints, and the user may indicate that cost is a hard constraint and they are willing to violate the latency constraint. This process can occur iteratively until a solution is found.

In some illustrative embodiments, mechanisms are provided that implement additional computing logic for automatically determining which constraints conflict with each other and evaluating a "what-if" analysis or similar technique to determine which constraints should be considered hard versus soft. For example, each of the possible combinations of hard/soft constraints may be iteratively, and automatically evaluated to determine which combinations present possible solutions, i.e., combinations for which a solution is able to be identified in that an AI computer model satisfying the constraints is able to be selected. The results of the combinations may be presented to a user and the user may select which result is satisfactory to the user with the corresponding designation of hard/soft constraints being selected as a result. In other illustrative embodiments, an iterative process of removing constraints, until a solution is able to be selected, e.g., iteratively removing hard constraints until a solution is able to be selected, at which point the removed hard constraints may be set to be soft constraints. In still other illustrative embodiments, the performance of the AI computer models during previous executions may be maintained in a historical data structure, where the performance information may be associated with particular settings of soft/hard constraints. As a result, a mapping of performance to soft/hard constraints may be maintained and used to inform the selection of an AI computer model as well as to identify which constraints should be set to soft/hard in order for that AI computer model to provide a satisfactory level of performance.

In some illustrative embodiments, a dependency graph of the various potential constraints may be utilized to select which constraints are the ones that should be considered hard constraints and which should not among the conflicting constraints. The dependency graph captures the relationship between constraints, e.g., response time and hardware costs depend on each other since faster response times are obtained from more powerful hardware (e.g., GPUs are faster than CPUs) but are also more costly. Thus, if the constraints are that the response time should be less than 1 second, which would require a GPU and the cheapest GPU is $1000+, then setting the cost to less than $500 is not achievable. Since response time and cost depend on each other, and only one of the two can be achieved, then one of these constraints should be a soft constraint and the other a hard constraint, where again the hard constraints are those that should not be violated, while soft constraints are those that should be achieved if possible, but may be violated if necessary, i.e., satisfying the soft constraints is optional.

Now consider the case where a new constraint may be defined by the system administrator, organization policy configuration of the system, or the like. A what-if analysis may be used to learn the dependencies between the new constraint and the constraints in the dependency graph, as discussed previously. Based on the findings of the what-if analysis, the new constraint can be added into the dependency graph as a node and edges added to other constraints where there is a relationship between them. For example, consider a construction contractor who leverages AI to provide quotes to clients on construction projects. The new constraint the contractor introduces is that they do not want to underestimate the cost of the project, i.e., underestimating the cost of the project is much worse than overestimating the cost. This measure relates to accuracy but focuses on one part of errors which are under-estimations. This measure may also be related to response time since some models can be implemented to provide a rough estimate very quickly but take longer to come up with more accurate estimates. These dependencies can be either provided by an administrator who knows enough about the new constraints, or can be learned by simulating different constraint values and determining the impact on other constraints, with the emerging pattern being used to extrapolate a relationship: dependent or not dependent. The relationship may then be used to generate the edges connecting a node corresponding to the constraint to other related constraints in the hierarchy of the dependency graph data structure.

As noted above, the dependency graph data structure can be specified by an administrator or learned by performing what-if analyses, such as discussed above. In some cases, crowd-sourcing of information regarding dependencies between constraints may be used to generate the dependency graph as well. To learn new edges in the dependency graph, consider an example of a new latency constraint that does not already appear in the dependency graph. Sampling the solution space across the various constraints may reveal that there is a correlation between latency and hardware cost, in that solutions with lower latencies tend to increase the hardware cost. The result of this analysis would be to augment the dependency graph with a new node for the latency constraint, and an edge between the latency and hardware cost constraints. Augmenting the dependency graph in this way can include a step to get confirmation from an administrator before updating the graph.

This augmented dependency graph can then be used to help distinguish hard and soft constraints, e.g., nodes with fewer ancestors in the dependency graph are better candidates to be hard constraints since there are fewer other constraints that potentially conflict with them. While the selection of constraints to be hard/soft may be performed automatically in some illustrative embodiments, in other illustrative embodiments, recommendations regarding the setting of constraints to hard/soft may be made automatically, but the final determination of which constraints are hard or soft may be decided by the administrator. Thus, the dependency graph in such illustrative embodiments may be used to offer recommendations and find viable solutions before input from the administrator is obtained to provide the final confirmation or selection of which constraints are hard or soft. These are only examples of ways to determine which constraints are hard/soft constraints, and it should be appreciated that any suitable logic for setting the constraints to soft/hard constraint categories may be used without departing from the spirit and scope of the present invention.

The illustrative embodiments provide an improved computing tool and improved computing tool operations/functionality that evaluates the input data, and specifically a similarity of the input data to a distribution of previously received input data from the same user, or a group/population of users, and uses this similarity and constraints to select which of the rule-based engine, shallow classifier machine learning computer model, or foundation model to use to process the input data. That is, the illustrative embodiments select the most appropriate AI computer model that gives a sufficient level of performance, e.g., accuracy, responsiveness, etc., while minimizing costs of utilizing the AI computer model, within constraints specified for the processing of the input data. The selection may be based on the similarity of the input data to the distributions of other input data, but may also be determined based on the cost metric constraints and user/administrator constraints, and whether such constraints have been specified or determined to be soft/hard constraints. The selected AI computer model is then used to process the input data and provide the results.

The input distributions to which the current input is compared may be calculated using distance metrics, such as vector distance metrics and vector distance based similarity evaluates based on such vector distance metrics, or the like. That is, the inputs from users may be natural language text. This natural language text may be converted to vector representations, such as via a Word2Vec or other natural language encoder or vector embedding tool. The vector representations may then be evaluated using vector distance metrics and similarity analysis which essentially clusters the vector representations to determine how similar or different the content of the natural language input is to other natural language inputs. These inputs may be processed by the various different AI computer models with different levels of performance, e.g., accuracy, recall, and other performance metrics. Some AI computer models may perform better than others for different types of inputs, e.g., different clusters of inputs. For example, a first cluster may represent relatively non-complex inputs that do not require AI computer models that can handle large diversity of inputs, while a second cluster may represent relative complex, i.e., diverse, inputs that required relatively larger diversity of input capable AI computer models.

Looking at the results of the performance of the various AI computer models on different types of inputs, e.g., clusters of inputs, it can be determined which AI computer models provide a sufficient performance for different types of AI computer models. For example, assume that the different AI computer models are a rules-based AI computer model, a shallow classifier AI computer model, and a foundation model. It may be determined that the foundation model performs well for all inputs, the shallow classifier AI computer model performs well for non-complex and mildly complex inputs, and that the rules-based AI computer model performs well for only the non-complex inputs. Thus, for each clustering of inputs, it may be determined from the performance metric information, a relative ranking of the AI computer models as to which are better/less performing for that type of input.

Each cluster may be a distribution of inputs and all of the inputs together may represent an overall distribution of the inputs. Comparing a current input to the distribution, to determine where the current input is most similar to the distribution, can then be used to identify which AI computer model(s) are best performing for similar inputs in the distribution of the inputs. It should be appreciated that these distributions may be determined for a single user over time, or for multiple users over time, such as a specific group of users or a more general population of users.

Thus, a correlation between distributions of inputs and performance of AI computer models is generated through the collection of the performance data for the AI computer models on the various inputs, and the distributions of the features of the inputs based on the vector representations of the inputs. In addition, the constraint data may further be quantified so as to create a representation of how costly an AI computer model is to operate on an input and generate a result. Again, these constraints/costs may include hardware costs, software costs, utility costs, ancillary equipment costs, environmental costs (e.g., thermal pollution or the like), etc. Through the quantification of all of these characteristics of the AI computer models, the mechanisms of the illustrative embodiments may determine, for the various available AI computer models, which distributions of inputs they are best performing, satisfactorily performing, and the like, and what the expected costs are for applying the AI computer models to a given input.

Based on these quantifications and correlations, as well as user/admin specified constraints, thresholds may be established for making decisions between the various AI computer models to use. The thresholds may be used on measures of similarity between the input data and the distribution(s) of previous input data by the same and/or different users. These thresholds may be defined by the user/admin or automatically learned in a paradigm that leverages human feedback. For example, assume that the AI computer models comprise intent classifiers for classifying the intent of natural language input, where these intent classifiers may be regular expression (regex) based computer models, including a shallow machine learning computer model, and a large language model (LLM) such as ChatGPT or the like. Also assume for this example, that there are three sets of sentences that can be classified by each of the models with 90+ % accuracy (i.e., set "1" has sentences that regex can classify with 90+ % accuracy).

When a new sentence is received, e.g., "Create a scatter plot", a distance measure is calculated (e.g., cosine similarity or other distance metric, where close to zero is not similar, close to 1 is similar) between the input sentence and the sentences in those sets, e.g., set "1", set "2", set "3", etc., to obtain an average distance for each set, e.g., the input has an average cosine similarity of 0.9 to set "1", an average cosine similarity of 0.65 to set "2", etc. The threshold can be set to any suitable value for the particular implementation, e.g., a threshold of 0.7 (on a scale of 0 to 1). Thus, since the input has a similarity to set "1" greater than 0.7, but less than 0.7 for set "2", the regex model which processes similar sentences at 90+ % accuracy will be selected. The value of 0.7 for the threshold can be set by an administrator, based on experimentation, or the like.

In some illustrative embodiments, multiple thresholds may be established for selecting the AI computer model to process an input. For example, a first threshold may be specified that indicates that if a user's input is within the threshold level of similarity to the distribution of previous inputs, e.g., the distance between the input and the distribution of the past N inputs is less than the first threshold (i.e., has a threshold level of similarity or greater and thus, a smaller distance), then a rule-based AI computer model which operates on regular expressions (regex), may be satisfactory for processing the input, i.e., the inputs from the user do not have a large amount of diversity and thus, a rules-based AI computer model is able to handle the input and provide a sufficient performance. Notably, while a shallow classifier AI computer model or foundation model could be used, this would incur additional unnecessary costs without an appreciable improvement in performance given the non-diverse inputs from the user.

A second threshold may be established that determines, assuming that the similarity of the user input is not within the first threshold of similarity to the distribution of previous inputs, e.g., the past N inputs, whether the distance between the input and the distribution of past user inputs is greater than this second threshold, indicating a large diversity in the input from the past inputs. In such a case, a foundation model may be the best performing option for processing the input. If however, the distance does not exceed this second threshold, then a shallow classifier AI computer model may be selected. Thus, by comparing the similarity metrics of the characteristics of the input to the distributions, or clusters, of previous inputs based on the characteristics of these previous inputs, and associating with these different distributions or clusters a corresponding type of AI computer model to use in processing those types of inputs, and using thresholds on the similarity, the mechanisms of the illustrative embodiments may select an appropriate AI computer model for processing the input. This may be further evaluated with regard to user/administrator, organization policy defined, or other specified constraints on the selection of AI computer models, e.g., hardware costs less than $1000, response time less than 10 seconds, accuracy equal to or greater than 80%, etc.

The above is an example of a decision tree type determination mechanism which may be implemented as part of an AI computer model selection engine. In other illustrative embodiments, similar decision making may be performed based on a trained machine learning computer model trained to classify the input with regard to the various different types of AI computer models. Whether decision tree or other type of machine learning computer model, the AI computer model selection engine selects an AI computer model for processing the input based on the distribution of previous inputs and a similarity of a current input to this distribution.

As noted above, in some illustrative embodiments, the constraints specified by the user/administrator, organization, or the like, as well as other costs constraints, may be input as additional data upon which the selection of AI computer models may be based. That is, in addition to the similarity of the input to the distribution, and the evaluation based on the established thresholds, the constraints may be evaluated to determine which AI computer models satisfy the specified constraints, e.g., hardware costs less than $ X, response time less than Y, etc. That is, soft constraints are optional and may be violated but should be satisfied if possible, however hard constraints cannot be violated and must be satisfied. Based on the hard constraints, the selection of the AI computer model may be modified to select an AI computer model that satisfies the hard constraints, satisfies as many of the soft constraints as possible, and is further based on the similarity of the input to the distribution of previous inputs.

In some cases, no solution may be determined to satisfy the constraints. In such cases, a default action may be specified. This may involve outputting a notification to the user that an appropriate AI computer model is not able to be selected and giving the user a reason why the AI computer model could not be selected, i.e., which constraints were not able to be satisfied and providing a suggestion as to how to modify the constraints to allow for an AI computer model to be able to be selected, e.g., changing a constraint from a hard constraint to a soft constraint. In some cases, the default condition may be a selection of a particular AI computer model as a default model, e.g., a foundation model as it has the most diversity of inputs able to be handled.

In addition, the illustrative embodiments provide an improved computing tool and improved computing tool operations/functionality for providing feedback to users as to the costs involved in providing the results of the processing of their inputs. The costs may be evaluated with regard to the various criteria, e.g., carbon footprint, hardware costs, utilities costs, etc. The user may be given controls to adjust criteria based on this feedback so as to allow for modification of the selection of the AI computer model for future inputs from this user, e.g., if the user wishes to reduce their carbon footprint, they may provide user inputs to a user interface providing the feedback information, to adjust their criteria to favor selection of lower carbon footprint AI computer models when processing future inputs.

The user interface providing user feedback may include user controls that are able to be manipulated by a user to specify different constraints for optimizing the selection of an AI computer model, e.g., optimize based on carbon footprint. These user controls may be implemented in various different ways including natural language input devices and corresponding processing logic, e.g., the user may speak a constraint of "response time to user queries should be within 3 seconds". The user controls may include user interface elements for selecting and modifying template based rules, e.g., "Response time (seconds) LESS THAN 3". These user controls may also include user interface elements where values or ranges of values can be entered and/or where categorical or Boolean constraints, checkboxes, or lists can be provided. Regardless of the form of the user controls provided, these controls may operate as constraints in the selection of the AI computer model or may operate as override controls, depending on the desired implementation. For example, if a user selects to optimize based on carbon footprint, rather than automatically selecting an AI computer model based on evaluation of the various distributions and similarities of input to the distributions, as well as other criteria, the lowest carbon footprint AI computer model may be selected instead.

In some illustrative embodiments, the user interface may further include information specifying "under-the-hood" evaluations performed for selection an AI computer model, e.g., which constraints are being utilized and how, what distributions are being utilized, etc. For example, the user interface may specify that the AI computer model selection is being performed based on a low footprint model and low diversity of the input data.

In some illustrative embodiments, the user interface may further include information specifying an estimated cost of the selected AI computer model. This cost information may include an overall cost estimate as well as an itemized cost estimate for different types of costs, e.g., hardware costs, software costs, utility costs, carbon emissions costs, etc. This information may be used as feedback for the user to determine whether they want to adjust their user specified constraints, e.g., the carbon emissions costs are too high so the user may want to select lower carbon footprint AI computer model options.

In some illustrative embodiments, when the selection of an AI computer model fails to result in a solution, the user interface may provide feedback with regard to modifications to constraints, modifications to input that may make the input more/less diverse relative to the distribution of previous inputs, or the like. For example, a "Do you mean . . . ?" type prompt may be displayed in which an alternative to the previous entered input may be included in the prompt to suggest an alternative input that may result in a solution.

It should be appreciated that the illustrative embodiments operate to automatically make the selection of AI computer models in real time as users interact with the computing system employing these AI computer models, e.g., conversation bots or other AI based computing systems. The illustrative embodiments operate to minimize cost and maximize accuracy and input space coverage while taking into consideration user and administrator specified constraints. Thus, the selection of the AI computer model may change dynamically such that for certain inputs, different AI computer models are determined to be the optimum selection for handling the particular input. The illustrative embodiments provide user feedback and controls to the users to inform them as to the reasoning for AI computer model selection and providing an ability to adjust the operation of AI computer model selection mechanisms to better fit with their needs.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an artificial intelligence (AI) computer model selection system that operates automatically, and in real-time, based on user input, to select an AI computer model to process the input based on a similarity of the user input to a distribution of previous user inputs and other criteria. The improved computing tool implements mechanism and functionality, such as the elements and functionality attributed to the elements in FIG. 3, which cannot be practically performed by human beings either outside of, or with the assistance of, a technical environment, such as a mental process or the like. The improved computing tool provides a practical application of the methodology at least in that the improved computing tool is able to provides an automated and real-time selection of AI computer models based on a user input for processing the user input that minimizes costs while maximizing performance in view of specified constraints on the selection of the AI computer models.

FIG. 2 is an example diagram of a distributed data processing system environment in which aspects of the illustrative embodiments may be implemented and at least some of the computer code involved in performing the inventive methods may be executed. That is, computing environment 200 contains an example of an environment for the execution of at least some of the computer code involved in performing the inventive methods, such AI computer model selection system 300. In addition to AI computer model selection system 300, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and AI computer model selection system 300, as identified above), peripheral device set 214 (including user interface (UI), device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in AI computer model selection system 300 in persistent storage 213.

Communication fabric 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, the volatile memory is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface type operating systems that employ a kernel. The code included in AI computer model selection system 300 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

As shown in FIG. 2, one or more of the computing devices, e.g., computer 201 or remote server 204, may be specifically configured to implement an AI computer model selection system 300. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 201 or remote server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automatic and real-time selection of AI computer models for processing a user input based on the similarity of the user input to a distribution of previous user inputs and specified constraints on the selection of the AI computer model, where the selection seeks to minimize costs associated with processing the input by the selected AI computer model.

Figure 3:
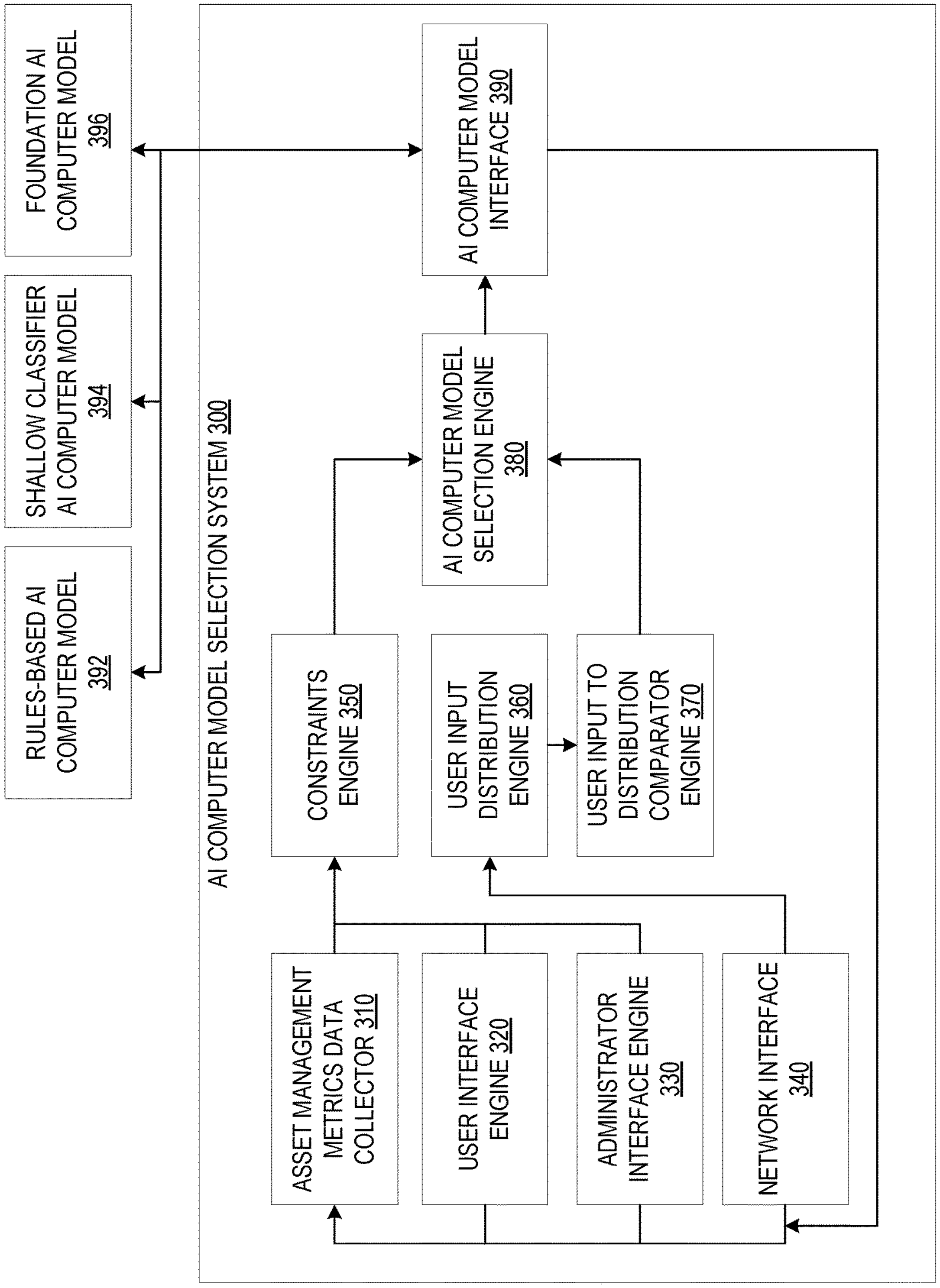
FIG. 3 is an example diagram illustrating the primary operational components of an AI computer model selection system in accordance with one illustrative embodiment.

FIG. 3 is an example diagram illustrating the primary operational components of an AI computer model selection system in accordance with one illustrative embodiment. The operational components shown in FIG. 3 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., inputs to be processed by the selected AI computer model, inputs specifying constraints or modifications to constraints based on user feedback provided by the AI computer model selection system, etc., and the resulting output may aid human beings, e.g., results of processing the input, user feedback information in user interface, etc. The invention is specifically directed to the automatically operating computer components directed to improving the way that an AI computer model is selected for processing a given input, and providing a specific solution that implements automatic, real-time AI computer model selection and processing of inputs by the selected AI computer model, which cannot be practically performed by human beings as a mental process and is not directed to organizing any human activity.

As shown in FIG. 3, the AI computer model selection system 300 includes an asset management metrics data collector 310, a user interface engine 320, and administrator interface engine 330, a network interface 340, a constraints engine 350, a user input distribution engine 360, a user input to distribution comparator engine 370, an AI computer model selection engine 380, and an AI computer model interface 390. The network interface 340 provides a data communication interface through which data is received and sent via one or more data networks. The asset management metrics data collector 310 operates to collect asset management metrics data from various sources. The asset management metrics data collector 310 may include such tools as IBM Maximo and the like, that collect and analyze data to determine costs associated with the execution and performance of AI computer models on input. The user interface engine 320 and administrator interface engine 330 provide similar user interfaces through which users and administrators may be presented with the costs information for the various AI computer models as well as provide input to specify constraints for selection of AI computer models. In addition, user interface engine 320 may present results of the selection of AI computer models and the processing of user input via the selected AI computer models, as well as present controls that the user can interact with the modify constraints for future selections of AI computer models and/or modify the user input, such as in the case of a suitable AI computer model not being able to be selected or results of the selected AI computer model processing the user input not being satisfactory to the user.

The constraints engine 350 comprises logic for evaluating constraints, determining which constraints are soft constraints and which are hard constraints, if not already specified by the user/administrator, and determining tradeoffs between constraints. The user input distribution engine 360 comprises logic that evaluates user inputs over time and generates a corresponding distribution of the user inputs that may be used to evaluate additional user inputs to perform AI computer model selection. As new user inputs are received, they may be added to the distribution such that the distribution may be built up over time. The user input to distribution comparator engine 370 comprises logic that operates to compare a current user input to the distribution of previous user inputs to determine a measure of similarity, such as a vector difference or other measure of similarity between the current user input and the distribution. This measure of similarity may be input to the AI computer model selection engine 380 along with the constraints from the constraint engine 350.

The AI computer model selection engine 380 operates on the constraints to determine the candidate AI computer models that may be selected from. This may include evaluating the ability to violate soft constraints while adhering to hard constraints. From the available AI computer models, the AI computer model selection engine 380 executes an evaluation of the similarity measure against established thresholds to determine which AI computer model to select to process the user input. Again, this may include determining which AI computer model is appropriate for the user input based on this measure of similarity, and which maximizes the number of soft constraints satisfied, while satisfying each of the hard constraints. In some cases, this may not result in an AI computer model being selected, i.e., the selection may fail because not all of the hard constraints can be satisfied.

The AI computer model interface 390 comprises the logic for interfacing with each of the AI computer models and provides a communication interface through which the selected AI computer model can be instructed to process the user input and provide the results, and potentially additional performance information for presentation to a user via a user interface as user feedback information. The results of the AI computer model operation as well as performance information may be presented to a user or administrator via the user interface engine 320 and administrator interface engine 330. The user or administrator may then interact with the interface to modify constraints as desired with the updated constraints being submitted to the constraints engine 350 for implementation.

The AI computer model interface 390 may interface with various types of pre-trained AI computer models 392-396 and the AI computer model selection engine 380 may select between these pre-trained AI computer models 392-396 for application to an input. For example, the pre-trained AI computer models 392-396 may include a rule-based AI computer model 392, a shallow classifier machine learning computer model 394, and a large scale deep learning AI computer model, large language model (LLM), or the like, i.e., a foundation model 396. As discussed above, these computer models 392-396 vary in complexity and diversity of inputs able to be processed accurately, vary in costs such as costs in terms of resources for generating, training, and maintaining the computer models, costs in terms of resources for utilizing the computer models to process user inputs including hardware, software, and utility costs, costs in terms of environmental impact, and the like.

In order to collect data about resource consumption and other cost metrics related to asset management for the various AI computer models, such data may be collected and processed automatically by the asset management metrics data collector 310, e.g., IBM Maximo is a computing tool that provides data identifying carbon footprints, power consumption, and the like, but other tools may provide similar data, such as system logs, power meters, etc. In addition, or alternatively, such resource consumption information may be provided by authorized users, administrators, or other sources of such information as input, such as via a user interface or administrator interface via the engines 320-330. The collected data may be provided to the constraints engine 350 which processes the collected constraint data to calculate the values of various constraints, such as hardware costs constraints, software costs constraints, performance constraints, carbon footprint constraints, and the like.

In addition to these constraints, users and system administrators may further specify constraints on the selection of AI computer models for processing inputs. The user and system administrator constraints may specify criteria for optimizing the selection of the AI computer models, e.g., "optimize for carbon footprint", "optimize for response time", etc. Such constraints may be specified via one or more user interfaces, system administrator interfaces, and the like, provided via the engines 320-330 which may be generated based on data from the constraints engine 350 specifying the constraints that the user/administrator may control. The user/administrator interfaces allow input of such user/admin constraints via one or more user interface elements, e.g., drop-down menus, checkboxes, fields for entering values for the constraints, specifying the constraints using natural language input, or the like.

Once the constraints are gathered, the constraints engine 350 distinguishes which of the constraints are soft constraints and which are hard constraints. Which constraints may be considered soft constraints and which are hard constraints may be specified by the user/administrator when specifying the constraints themselves, e.g., via the user/admin interfaces provided by engines 320-330. However, for some constraints, the users/admin may not know which constraints to designate soft/hard. In such cases, the constraints engine 350 automatically determines which constraints conflict with each other and evaluates a "what-if" analysis or similar technique to determine which constraints should be considered hard versus soft. In some illustrative embodiments, the constraints engine 350 utilizes a dependency graph of the various potential constraints, which may be specified by a system administrator or other authorized individual when configuring the constraints engine 350, to select which constraints are the ones that should be considered hard constraints and which should be considered soft constraints among the conflicting constraints. Any suitable logic for setting the conflicting constraints to soft/hard constraint categories may be used without departing from the spirit and scope of the present invention.

The AI computer model selection system 300 receives user input via the network interface 340 from one or more user computing devices. In some illustrative embodiments, when building the user input distribution(s), training data may be provided via the network interface 340 for the specific purpose of generating the user input distribution(s) for later use in selecting an AI computer model based on new user input received via the network interface 340. The user input distribution may be updated as new user input is received such that the user input distribution is updated over time.

The user input distribution engine 360 generates the user input distribution(s). The user input distribution(s) may include a distribution that corresponds to user input of a plurality of users, such as a specified group of users or a population of users, e.g., all users of a particular application for which the AI computer models are used to provide functionality, a subset of all users, or the like. This distribution may be over time or a previous number of user inputs from the various users. The user input distribution(s) may include a distribution of a specific user's input over a plurality of previous user inputs, e.g., last N user inputs from the particular user.

The current user input received via the network interface 340 may be provided along with the user input distribution (s) to the user input distribution comparator engine 370 which evaluates the input data, and specifically a similarity of the input data to one or more of the distributions. The user input distribution comparator engine 370 generates a measure of similarity between the user input and the distribution. In some cases, this measure of similarity may be a vector similarity measure, such as a distance metric, e.g., cosine similarity, L2-normalized Euclidean distance, angular similarity, or the like. The measure of similarity is calculated and provided to the AI computer model selection engine 380 along with the constraints from the constraints engine 350.

That is, in some illustrative embodiments, the user inputs from users may be natural language text, such as statements, requests, responses, and the like. This natural language text may be converted to vector representations, such as via a Word2Vec or other natural language encoder or vector embedding tool. The vector representations may then be evaluated using vector distance metrics and similarity analysis which essentially clusters the vector representations to determine how similar or different the content of the natural language input is to other natural language inputs, e.g., previous user inputs represented as vectors and the vectors used to generate the user input distributions.

The AI computer model selection engine 380 uses the similarity measure and constraints to select which of the available AI computer models to use to process the user input, e.g., the rules-based AI computer model 392, shallow classifier AI computer model 394, or foundation AI computer model 396. That is, the AI computer model selection engine 380 uses a trained machine learning model, decision tree computer model, or the like, to select the most appropriate AI computer model 392-396 that gives a sufficient level of accuracy while minimizing costs of utilizing the AI computer model 392-396, within constraints specified for the processing of the input data. The selection may be based on the similarity of the input data to the distributions of other input data, but may also be determined based on the cost metric constraints and user/admin constraints from the constraints engine 350, and whether such constraints have been specified or determined to be soft/hard constraints by the user/admin or automatically by the constraints engine 350. The selected AI computer model 392-396 is then used to process the input data, via the AI computer model interface 390, and the results of such processing may be returned via the AI computer model interface 390.

As noted previously, the performance of the various AI computer models 392-396 on different types of inputs, e.g., clusters of inputs, is different and it can be determined which AI computer models provide a sufficient performance for different types of AI computer models. For example, it may be determined that the foundation AI computer model 396 performs well for all inputs, the shallow classifier AI computer model 394 performs well for non-complex and mildly complex inputs, and that the rules-based AI computer model 392 performs well for only the non-complex inputs. Thus, for each clustering of inputs, it may be determined from the performance metric information, a relative ranking of the AI computer models as to which are better/less performing for that type of input.

Comparing a current input to the distribution, to determine where the current input is most similar to the distribution, can then be used to identify which AI computer model(s) 392-396 are best performing for similar inputs in the distribution of the inputs. Thus, a correlation between distributions of inputs and performance of AI computer models 392-396 is generated through the collection of the performance data for the AI computer models 392-396 on the various inputs, and the distributions of the features of the inputs based on the vector representations of the inputs. In addition, the constraint data from the constraints engine 350 may further be quantified so as to create a representation of how costly an AI computer model 392-396 is to operate on an input and generate a result. Again, these constraints/costs may include hardware costs, software costs, utility costs, ancillary equipment costs, environmental costs, etc. Based on the quantification of all of these characteristics of the AI computer models 392-396, the AI computer model selection engine 380 may apply its logic to these characteristics and determine, for the various available AI computer models 392-396, for which distributions of inputs they are best performing, satisfactorily performing, and the like, and what the expected costs are for applying the AI computer models 392-396 to a given input.

Based on these quantifications and correlations, as well as user/admin specified constraints, thresholds may be established in the AI computer model selection engine 380 for making decisions between the various AI computer models 392-396 to use. The thresholds may be used on measures of similarity from the user input to distribution comparator engine 370. For example, a first threshold may be specified that indicates that if a user's input is within the threshold level of similarity to the distribution of previous inputs, e.g., the distance between the input and the distribution of the past N inputs is less than the first threshold, then a rule-based AI computer model 392, which operates on regular expressions, may be satisfactory for processing the input, i.e., the inputs from the user do not have a large amount of diversity and thus, a rules-based AI computer model 392 is able to handle the input and provide a sufficient performance. Notably, while a shallow classifier AI computer model 394 or foundation AI computer model 396 could be used, this would incur additional unnecessary costs without an appreciable improvement in performance given the non-diverse inputs from the user.

A second threshold may be established that determines, assuming that the similarity of the user input is not within the first threshold of similarity to the distribution of previous inputs, e.g., the past N inputs, whether the distance between the input and the distribution of past user inputs is greater than this second threshold, indicating a large diversity in the input from the past inputs. In such a case, a foundation AI computer model 396 may be the best performing option for processing the input. If however, the distance does not exceed this second threshold, then a shallow classifier AI computer model 394 may be selected.

Again, this is an example of a decision tree type determination mechanism that may be implemented in the logic of the AI computer model selection engine 380. In other illustrative embodiments, similar decision making may be performed based on a trained machine learning computer model trained to classify the input with regard to the various different types of AI computer models 392-396. Whether decision tree or other type of machine learning computer model, the AI computer model selection engine 380 selects an AI computer model 392-396 for processing the input based on the distribution of previous inputs and a similarity of a current input to this distribution and constraints. That is, in addition to the similarity of the input to the distribution as performed by the user input to distribution comparator engine 370, and the evaluation based on the established thresholds by the AI computer model selection engine 380, the constraints may be evaluated by the AI computer model selection engine 380 to determine which AI computer models 392-396 satisfy the specified constraints. That is, soft constraints may be violated, however hard constraints cannot. Based on the hard constraints, the selection of the AI computer model 392-396 may be modified to select an AI computer model 392-396 that satisfies the hard constraints, satisfies as many of the soft constraints as possible, and is further based on the similarity of the input to the distribution of previous inputs.

In some cases, no solution may be determined by the AI computer model selection engine 380 to satisfy the constraints. In such cases, a default action may be specified. This may involve outputting a notification to the user that an appropriate AI computer model is not able to be selected and giving the user a reason why the AI computer model could not be selected, i.e., which constraints were not able to be satisfied and providing a suggestion as to how to modify the constraints to allow for an AI computer model to be able to be selected, e.g., changing a constraint from a hard constraint to a soft constraint. In the case of changing a constraint, constraint conflicts may be identified and data may be presented to a user indicating how modifying one constraint will allow another constraint to be satisfied, e.g., response time versus hardware cost. In some cases, the default condition may be a selection of a particular AI computer model 392-396 as a default model, e.g., a foundation AI computer model 396 as it has the most diversity of inputs, or a rules-based AI computer model 392 because it has the least costs.

The results of the AI computer model selection engine 380, the results of the application of the AI computer model 392-396 to the user input, suggestions as to modifications of constraints/user input, and the like, may all be provided to the user (and/or admin) as user feedback via the user interface generated by the user interface engine 320 and/or the administrator interface generated by the administrator interface engine 330. This feedback may include information specifying the costs involved in providing the results of the processing of user inputs. The costs may be evaluated with regard to the various criteria, e.g., carbon footprint, hardware costs, utilities costs, etc. The user/admin may be given controls to adjust criteria based on this feedback so as to allow for modification of the selection of the AI computer model 392-396 by the AI computer model selection engine 380 for future inputs from this user, e.g., if the user wishes to reduce their carbon footprint, they may provide user inputs to a user interface providing the feedback information, to adjust their criteria to favor selection of lower carbon footprint AI computer models 392-396 when processing future inputs. This information may be communicated to the constraints engine 350 which may then implement the modifications or updates to the constraints.

The user/admin interface providing feedback may include user controls that are able to be manipulated by a user/admin to specify different constraints for optimizing the selection of an AI computer model 392-396, e.g., optimize based on carbon footprint. These controls may operate as constraints in the selection of the AI computer model 392-396 or may operate as override controls, depending on the desired implementation. For example, if a user selects to optimize based on carbon footprint, rather than the AI computer model selection engine 380 automatically selecting an AI computer model 392-396 based on evaluation of the various distributions and similarities of input to the distributions, as well as other criteria, the lowest carbon footprint AI computer model may be selected instead.

In some illustrative embodiments, the user interface may further include information specifying "under-the-hood" evaluations performed for selection an AI computer model 392-396, e.g., which constraints are being utilized and how, what distributions are being utilized, etc. For example, the user interface may specify that the AI computer model selection is being performed by the AI computer model selection engine 380 based on a low carbon footprint model and low diversity of the input data.

In some illustrative embodiments, the user interface may further include information specifying an estimated cost of the selected AI computer model 392-396. This cost information may include an overall cost estimate as well as an itemized cost estimate for different types of costs, e.g., hardware costs, software costs, utility costs, carbon emissions costs, etc. This information may be used as feedback for the user to determine whether they want to adjust their user specified constraints, e.g., the carbon emissions costs are too high so the user may want to select lower carbon footprint AI computer model options.

In some illustrative embodiments, when the selection of an AI computer model fails to result in a solution, i.e., the AI computer model selection engine 380 cannot select one of the AI computer models 392-396 that satisfy all the hard constraints, the user interface may provide feedback with regard to modifications to constraints, modifications to input that may make the input more/less diverse relative to the distribution of previous inputs, or the like. For example, a "Do you mean . . . ?" type prompt may be displayed in which an alternative to the previous entered input may be included in the prompt to suggest an alternative input that may result in a solution.

The selection of AI computer models 392-396 by the AI computer model selection engine 380 is performed automatically in real time as users interact with the computing system employing these AI computer models 392-396, e.g., conversation bots or other AI based computing systems. For example, the AI computer models 392-396 may be provided as part of a cloud computing system, such as a function-as-a-service (FaaS) type cloud computing system, which provides the functionality of the AI computer models 392-396 to other cloud applications. In such an embodiment, the cloud application may receive user input from a user, and employ the AI computer model selection system 300 as a FaaS function that selects an AI computer model 392-396 which is also a FaaS function that is employed to process the user input and provide the results back to the cloud application. In addition, the feedback and user/admin interfaces may be provided to the user/admin of the cloud application.

The AI computer model selection system 300 operates to minimize cost and maximize accuracy and input space coverage while taking into consideration user and administrator specified constraints. Thus, as the AI computer model selection system 300 operates automatically in real-time on user inputs, the selection of the AI computer model 392-396 may change dynamically such that for certain inputs, different AI computer models 392-396 are determined to be the optimum selection for handling the particular input. The illustrative embodiments provide user feedback and controls to the users/admins to inform them as to the reasoning for AI computer model selection and providing an ability to adjust the operation of AI computer model selection mechanisms to better fit with their needs.

Figure 4:
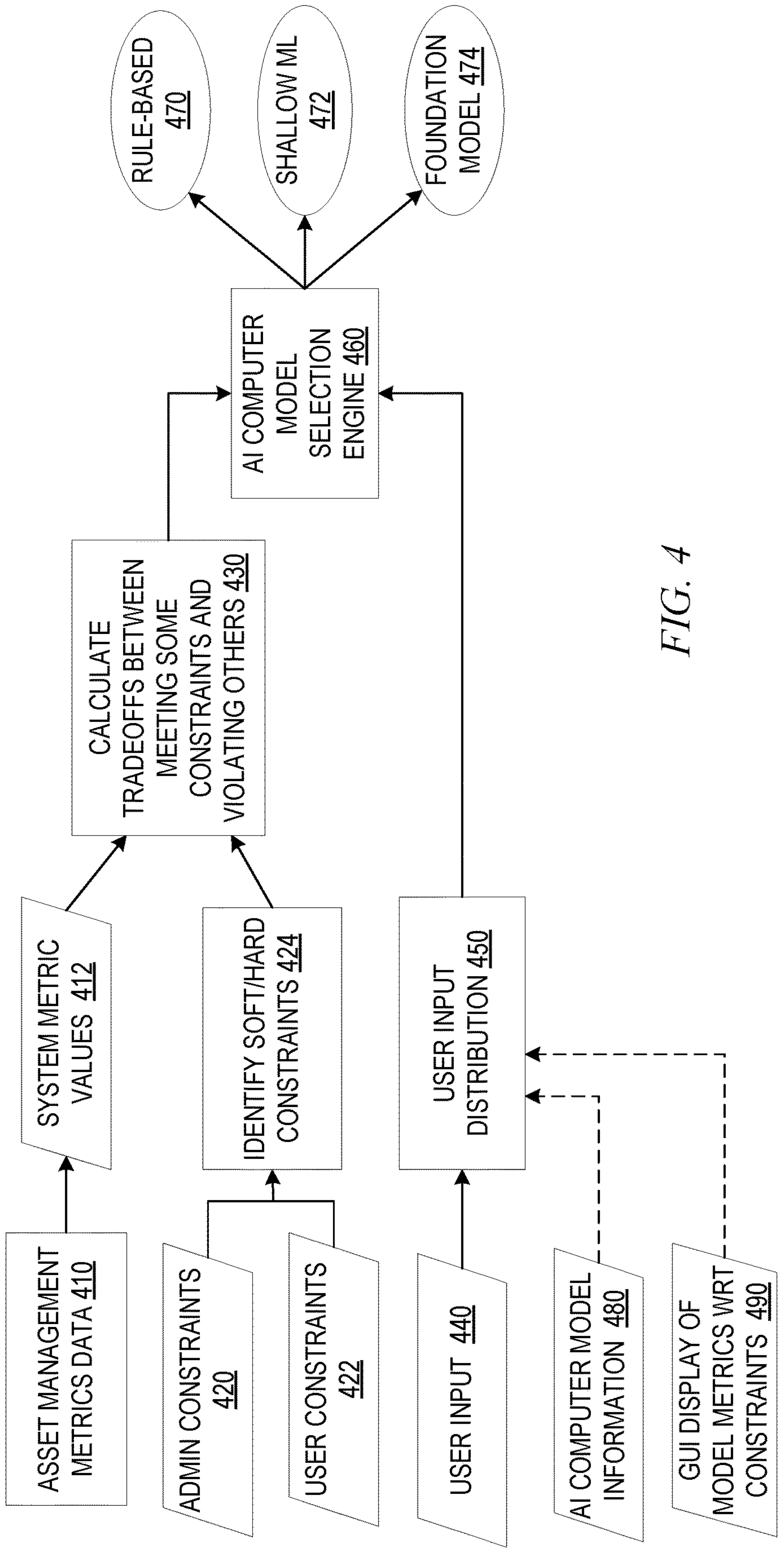
FIG. 4 is an example diagram illustrating a data flow in accordance with one illustrative embodiment.

FIG. 4 is an example diagram illustrating a data flow in accordance with one illustrative embodiment. As shown in FIG. 4, asset management metrics data 410, which is collected by the asset management metrics data collector 310, is used to generate system metric values 412. Administrator constraints 420 and user constraints 422 are a basis for identifying soft and hard constraints 424, such as by using a dependency graph and information theory processes. The system metric values 412 and soft/hard constraints 424 are then the basis for calculating the tradeoffs between meeting the requirements of the soft constraints and violating the soft constraints 430. This information is then input to the AI computer model selection engine 460 which uses this information, in addition to the comparison of the user input 440 to the user input distribution(s) 450, to select an AI computer model 470-474. The user inputs 440 may be user inputs received responsive to the display of AI computer model information 480 and performance metrics with respect to the various constraints 490 in one or more graphical user interfaces (GUIs) or the like. As noted previously, user interface elements may be provided for the user to modify constraints dynamically to determine how these modifications may allow for different selection of AI computer models, such as determining which constraints, if changed to soft constraints, will allow other constraints to be satisfied.

Figure 5A:
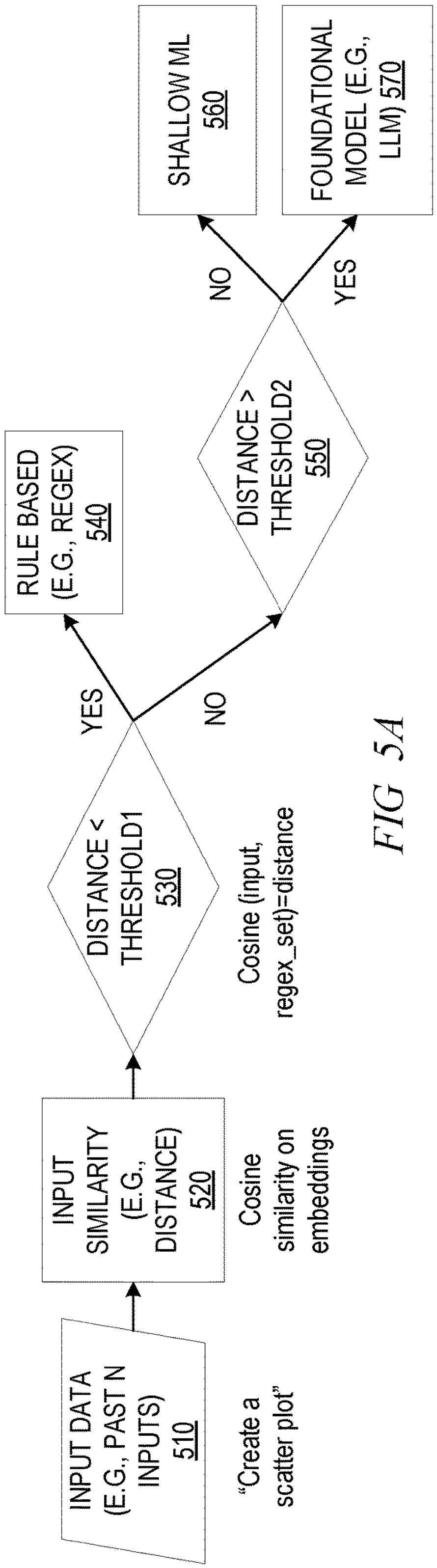
FIG. 5A is a first example diagram illustrating an AI computer model selection engine operation in accordance with one illustrative embodiment.

FIG. 5A is a first example diagram illustrating of an AI computer model selection engine operation in accordance with one illustrative embodiment. The example shown in FIG. 5A is an example of a decision tree based evaluation of the measure of similarity to thresholds which may be implemented by the AI computer model selection engine 380 of FIG. 3. It should be appreciated that a similar selection of an AI computer model may be accomplished through training of a machine learning computer model to classify the user input based on the measure of similarity and thereby select a corresponding AI computer model, e.g., using training data comprising user inputs and distributions, and evaluating measures of similarity to classify the user input to select an AI computer model, using ground truth to determine an error in the classification, and using machine learning algorithms to modify operational parameters to reduce the error through an iterative process until the error is equal to or below a given threshold or a predetermined number of iterations (epochs) of training have been performed.

As shown in FIG. 5A, assuming a decision tree computer model, the input data and a distribution of past inputs, e.g., last N user inputs, are received (510). Based on this user input and the distribution, a similarity metric (520), such as a distance measure, is determined to identify a similarity of the input to the distribution. A determination is made as to whether the distance measure is less than a first threshold (530). If the distance measure is less than the first threshold, then a regular expression based computer model, i.e., a rules-based AI computer model such as 392 in FIG. 3, is selected (540). If the distance measure is not less than the first threshold, then a determination is made as to whether the distance measure is greater than a second threshold (550). If the distance measure is greater than the second threshold, then the foundation AI computer model, e.g., a large language model (LLM), deep learning neural network (DNN), or the like, is selected (570). If the distance measure is not greater than the second threshold, the shallow classifier AI computer model is selected (560).

Figure 5B:
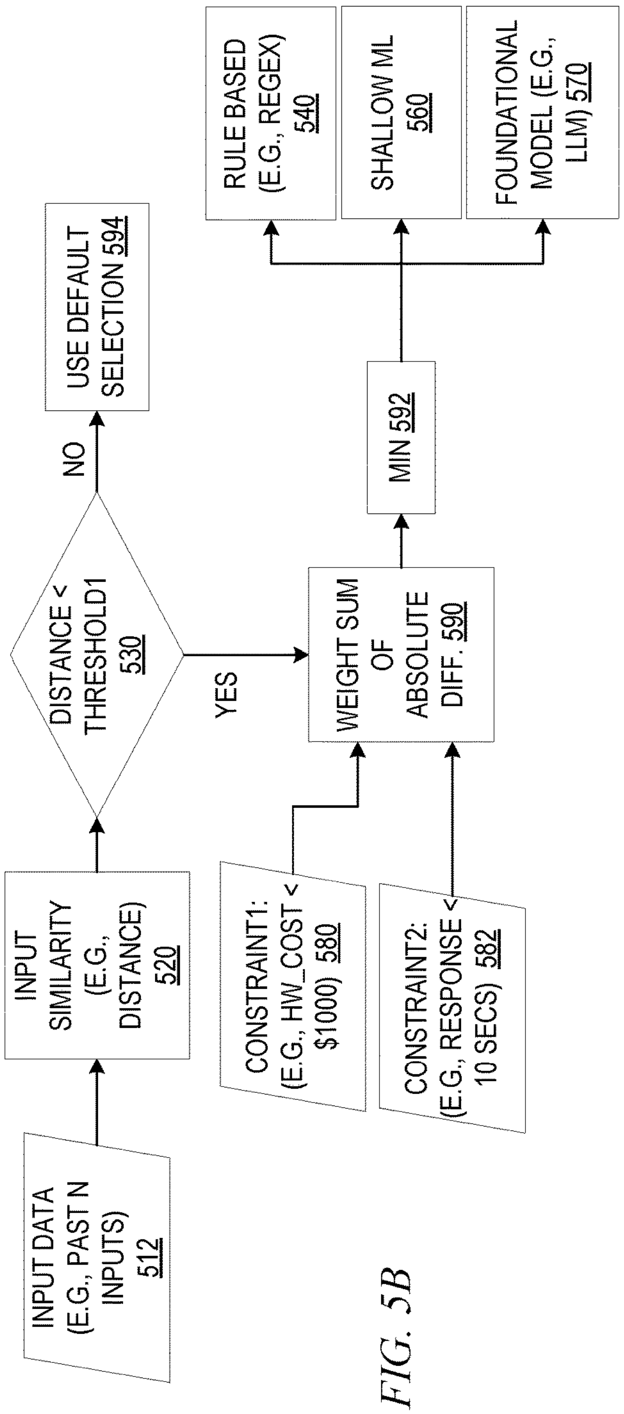
FIG. 5B is a second example diagram illustrating an AI computer model selection engine operation in accordance with one illustrative embodiment.

FIG. 5B is a second example diagram illustrating of an AI computer model selection engine operation in accordance with one illustrative embodiment. In this second example, a plurality of constraints 580-582 are introduced into the AI computer model selection engine operation. These constraints 580-582 are used to set weights to be applied to distance or difference calculations to generate weighted distances or differences. The weights themselves may be based on whether the constraints are soft constraints or hard constraints. For example, a weight may be set for hard constraints such that if the hard constraint is not satisfied by a given AI computer model associated with a distribution or cluster, then that AI computer model is not further considered as an option for processing the input sentence 512. Other weights may be assigned on a spectrum, e.g., 0.0 to 1.0, depending on a measure of softness of the corresponding constraints. It should be appreciated that while only two constraints are shown in FIG. 5B, in various implementations, any number of constraints may be considered.

Similar to FIG. 5A, N input sentences, which in this example of FIG. 5B is a single input sentence 512, are input and an input similarity metric is calculated with regard to the characteristics of the input sentence 512 and previously processed input data, e.g., distributions or clusters of previously processed input sentences, to determine distance measures, or similarity metrics (520). The distances for the various distributions or clusters are compared to a threshold (threshold1) to determine if the distances are less than the threshold (530). If none of the distances are less than the threshold, a default selection logic is implemented (594) to select an AI computer model to process the input sentence 512, e.g., using the foundation or LLM AI computer model 570.

If the distance is less than the threshold (530), then a weighted sum of the absolute difference, or distance, is determined (590) for each of the distances. The weights may be based on the constraints 580-582. That is, whether certain constraints 580-582 are satisfied or not, different weights are applied to the absolute distance to generate a weighted difference or distance. This weighted differences or distances are then evaluated to select the minimum weighted difference or distance (592) which is then used to identify the corresponding distribution or cluster to which the input sentence 512 is most similar and whose corresponding AI computer model most satisfies the constraints 580-582. The corresponding AI computer model 540, 560, or 570 is then selected for processing the input sentence 512.

Figure 6:
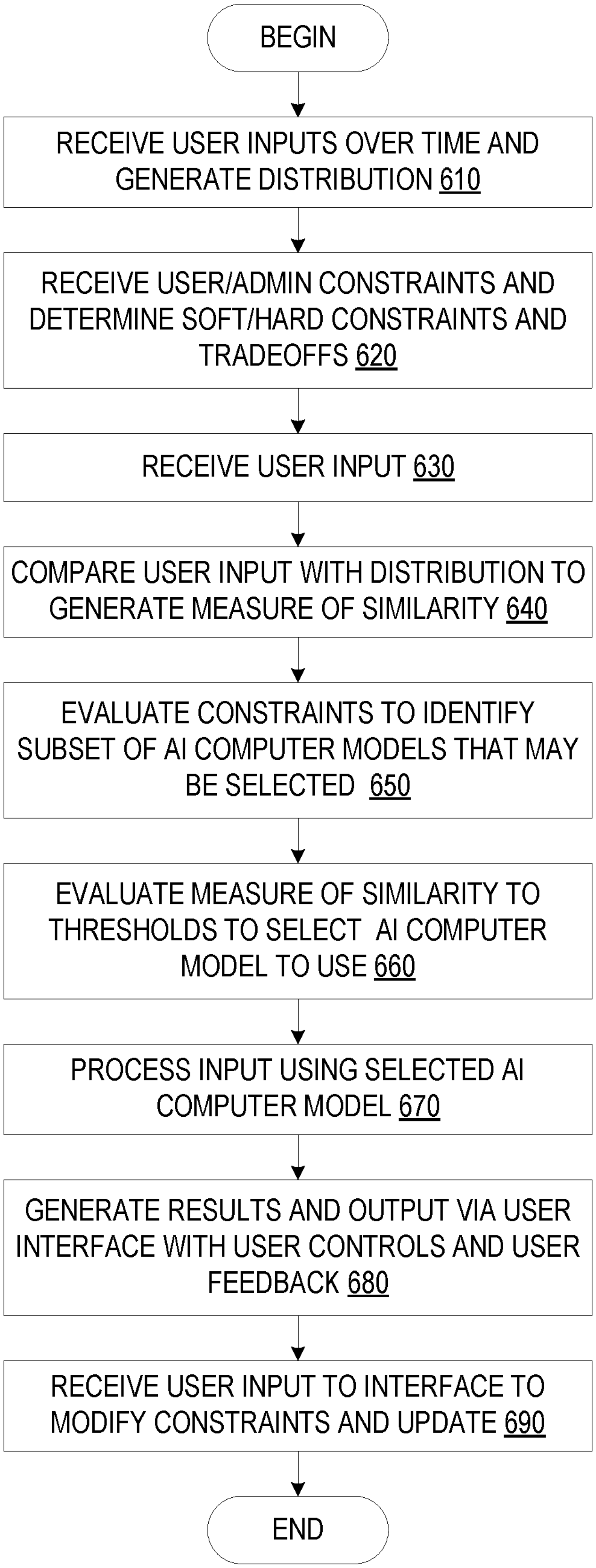
FIG. 6 is a flowchart outlining an example operation of an AI computer model selection system in accordance with one illustrative embodiment.

FIG. 6 is a flowchart outlining an example operation of an AI computer model selection system in accordance with one illustrative embodiment. It should be appreciated that the operations outlined in FIG. 6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 6, and may, in some cases, make use of the results generated as a consequence of the operations set forth in FIG. 6, the operations in FIG. 6 themselves are specifically performed by the improved computing tool in an automated manner.

As shown in FIG. 6, the operation starts by receiving user inputs over time and generating a distribution (step 610). User and/or administrator constraints are received and soft/hard constraints are determined as well as tradeoffs between satisfying or violating soft constraints (step 620). These operations establish the configuration for the AI computing model selection engine by specifying the distribution against which user inputs are compared, as well as which constraints will be used and the tradeoffs made by the AI computing model selection engine when selecting an AI computing model.

Thereafter, a user input is received (step 630). The user input is compared with the distribution to generate a measure of similarity between the user input and the distribution (step 640). The constraints are evaluated to identify a subset of AI computer models that may be selected (step 650). The measure of similarity is evaluated to thresholds to select an AI computer model to use from the subset of AI computer models (step 660).

The user input that was received (step 630) is then processed by the selected AI computer model (step 670). The results generated by the application of the selected AI computer model to the user input are returned to the user/administrator via the user/admin interface, which includes controls and feedback information (step 680). User/admin input to the interface is received and the constraints are modified and updated accordingly (step 690). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for selecting an artificial intelligence (AI) computer model for processing an input, the method comprising:

generating at least one distribution of first characteristics of previous input data processed by the data processing system, wherein the previous input data comprises a plurality of prior individual inputs received over time from an input provider, and wherein the first characteristics comprise prior-input vector embeddings generated from the plurality of prior individual inputs;

analyzing current input data comprising a current individual input received from the input provider to generate second characteristics of the current input data, wherein the second characteristics comprise a current-input vector embedding generated from the current individual input;

comparing the second characteristics of the current input data to the at least one distribution of first characteristics to generate at least one similarity metric, wherein the comparing comprises calculating one or more vector distances between the current-input vector embedding and one or more of the prior-input vector embeddings in the at least one distribution of first characteristics, and generating the at least one similarity metric based on the one or more vector distances;

processing, by an AI computer model selection engine, the at least one similarity metric to select, as a selected AI computer model, an AI computer model from a plurality of different AI computer models, wherein the processing of the at least one similarity metric comprises evaluation of the at least one similarity metric relative to one or more threshold values; and processing the current input data by the selected AI computer model to generate a result of processing the current input data.

2. The method of claim 1, wherein the previous input data comprises previous natural language content, the first characteristics comprise regular expressions present in the previous natural language content, and wherein the second characteristics comprise regular expressions present in the current input data.

3. The method of claim 1, wherein each distribution in the at least one distribution of first characteristics corresponds to a cluster of input data which correlates characteristics of the input data with performance of AI computer models.

4. The method of claim 1, wherein processing the at least one similarity metric to select the selected AI computer model comprises identifying, as the selected AI computer model, an AI computer model that corresponds to a distribution, in the at least one distribution of first characteristics, to which the current input data is most similar as indicated by the at least one similarity metric, and that provides performance and cost values that meet specified selection criteria.

5. The method of claim 1, wherein the plurality of different AI computer models comprise a rules-based AI computer model, a shallow classifier machine learning computer model, and a large scale deep learning AI computer model.

6. The method of claim 1, further comprising:

obtaining cost metrics for each of the plurality of different AI computer models, wherein the cost metrics specify costs related to asset management for operating a corresponding one of the plurality of different AI computer models; and generating one or more constraints, based on the cost metrics, for selecting one of the plurality of different AI computer models, wherein the one or more constraints include constraints on at least one of hardware costs, carbon footprint, utility costs, software costs, ancillary equipment costs, or environmental costs, wherein the processing of the at least one similarity metric to select the selected AI computer model from the plurality of different AI computer models is further based on the one or more constraints.

7. The method of claim 1, further comprising:

obtaining one or more selection constraints for selecting one of the plurality of different AI computer models, wherein the one or more selection constraints specify performance characteristics of AI computer models to optimize, wherein the processing of the at least one similarity metric comprises selecting, as the selected AI computer model, one of the plurality of different AI computer models based on which of the plurality of different AI computer models have characteristics meeting at least one of the one or more selection constraints.

8. The method of claim 7, wherein the one or more selection constraints comprise at least one hard constraint and at least one soft constraint, wherein the at least one hard constraint must be satisfied by the selected AI computer model, and wherein the selected AI computer model optionally satisfies the at least one soft constraint.

9. The method of claim 1, wherein the previous input data comprises previous natural language content, the current input data comprises current natural language content, and the plurality of different AI computer models are AI computer models that determine intent of the current natural language content.

10. The method of claim 1, wherein the current input data is natural language input to a conversation bot application, and wherein the second characteristics of the current input data include a determination of a level of complexity of the natural language input.

11. A computer program product comprising a computer readable storage medium having a computer readable program stored therein, wherein the computer readable program, when executed in a data processing system, causes the data processing system to:

generate at least one distribution of first characteristics of previous input data processed by the data processing system, wherein the previous input data comprises a plurality of prior individual inputs received over time from an input provider, and wherein the first characteristics comprise prior-input vector embeddings generated from the plurality of prior individual inputs;

analyze current input data comprising a current individual input received from the input provider to generate second characteristics of the current input data, wherein the second characteristics comprise a current-input vector embedding generated from the current individual input;

compare the second characteristics of the current input data to the at least one distribution of first characteristics to generate at least one similarity metric, wherein comparing the second characteristics of the current input data comprises calculating one or more vector distances between the current-input vector embedding and one or more of the prior-input vector embeddings in the at least one distribution of first characteristics, and generating the at least one similarity metric based on the one or more vector distances;

process, by an AI computer model selection engine, the at least one similarity metric to select, as a selected AI computer model, an AI computer model from a plurality of different AI computer models, wherein processing the at least one similarity metric comprises evaluation of the at least one similarity metric relative to one or more threshold values; and process the current input data by the selected AI computer model to generate a result of processing the current input data.

12. The computer program product of claim 11, wherein the previous input data comprises previous natural language content, the first characteristics comprise regular expressions present in the previous natural language content, and wherein the second characteristics comprise regular expressions present in the current input data.

13. The computer program product of claim 11, wherein each distribution in the at least one distribution of first characteristics corresponds to a cluster of input data which correlates characteristics of the input data with performance of AI computer models.

14. The computer program product of claim 11, wherein processing the at least one similarity metric to select the selected AI computer model comprises identifying, as the selected AI computer model, an AI computer model that corresponds to a distribution, in the at least one distribution of first characteristics, to which the current input data is most similar as indicated by the at least one similarity metric, and that provides performance and cost values that meet specified selection criteria.

15. The computer program product of claim 11, wherein the plurality of different AI computer models comprise a rules-based AI computer model, a shallow classifier machine learning computer model, and a large scale deep learning AI computer model.

16. The computer program product of claim 11, wherein the computer readable program further causes the data processing system to:

obtain cost metrics for each of the plurality of different AI computer models, wherein the cost metrics specify costs related to asset management for operating a corresponding one of the plurality of different AI computer models; and generate one or more constraints, based on the cost metrics, for selecting one of the plurality of the different AI computer models, wherein the one or more constraints include constraints on at least one of hardware costs, carbon footprint, utility costs, software costs, ancillary equipment costs, or environmental costs, wherein processing the at least one similarity metric to select the selected AI computer model from the plurality of different AI computer models is further based on the one or more constraints.

17. The computer program product of claim 11, wherein the computer readable program further causes the data processing system to:

obtain one or more selection constraints for selecting one of the plurality of different AI computer models, wherein the one or more selection constraints specify performance characteristics of AI computer models to optimize, wherein processing the at least one similarity metric comprises selecting, as the selected AI computer model, one of the plurality of different AI computer models based on which of the plurality of different AI computer models have characteristics meeting at least one of the one or more selection constraints.

18. The computer program product of claim 17, wherein the one or more selection constraints comprise at least one hard constraint and at least one soft constraint, wherein the at least one hard constraint must be satisfied by the selected AI computer model, and wherein the selected AI computer model optionally satisfies the at least one soft constraint.

19. The computer program product of claim 11, wherein the previous input data comprises previous natural language content, the current input data comprises current natural language content, and the plurality of different AI computer models are AI computer models that determine intent of the current natural language content.

20. An apparatus comprising:

at least one processor; and at least one memory coupled to the at least one processor, wherein the at least one memory comprises instructions which, when executed by the at least one processor, cause the at least one processor to:

generate at least one distribution of first characteristics of previous input data processed by the apparatus, wherein the previous input data comprises a plurality of prior individual inputs received over time from an input provider, and wherein the first characteristics comprise prior-input vector embeddings generated from the plurality of prior individual inputs;

analyze current input data comprising a current individual input received from the input provider to generate second characteristics of the current input data, wherein the second characteristics comprise a current-input vector embedding generated from the current individual input;

compare the second characteristics of the current input data to the at least one distribution of first characteristics to generate at least one similarity metric, wherein comparing the second characteristics of the current input data comprises calculating one or more vector distances between the current-input vector embedding and one or more of the prior-input vector embeddings in the at least one distribution of first characteristics, and generating the at least one similarity metric based on the one or more vector distances;

process, by an AI computer model selection engine, the at least one similarity metric to select, as a selected AI computer model, an AI computer model from a plurality of different AI computer models, wherein processing the at least one similarity metric comprises evaluation of the at least one similarity metric relative to one or more threshold values; and process the current input data by the selected AI computer model to generate a result of processing the current input data.

* * * * *